United States Patent
Morikaku et al.

(10) Patent No.: US 7,579,741 B2
(45) Date of Patent: Aug. 25, 2009

(54) AUTOMOTIVE DYNAMOELECTRIC MACHINE

(75) Inventors: Hideki Morikaku, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 11/515,817

(22) Filed: Sep. 6, 2006

(65) Prior Publication Data

US 2007/0052319 A1 Mar. 8, 2007

(30) Foreign Application Priority Data

Sep. 8, 2005 (JP) ............................. 2005-260656

(51) Int. Cl.
H02K 5/173 (2006.01)
H02K 5/20 (2006.01)
H02K 9/02 (2006.01)

(52) U.S. Cl. .......................... 310/239; 310/58; 310/90

(58) Field of Classification Search .................. 310/52, 310/58, 232, 90, 238
See application file for complete search history.

(56) References Cited

U.S. PATENT DOCUMENTS

| | | | | |
|---|---|---|---|---|
| 3,784,855 A | * | 1/1974 | Motegi et al. ............... | 310/227 |
| 4,137,474 A | * | 1/1979 | Krieger ....................... | 310/227 |
| 4,334,159 A | * | 6/1982 | Ooki et al. ................... | 310/54 |
| 5,296,772 A | * | 3/1994 | Bradfield et al. ............. | 310/242 |
| 5,424,600 A | * | 6/1995 | Ishikawa et al. ............. | 310/220 |
| 6,486,584 B2 | * | 11/2002 | Chang ......................... | 310/239 |
| 6,515,398 B1 | * | 2/2003 | Fudono et al. ............... | 310/239 |
| 6,664,699 B2 | * | 12/2003 | Shioya et al. ................ | 310/239 |
| 7,417,353 B2 | * | 8/2008 | Wada et al. .................. | 310/239 |
| 2002/0047465 A1 | * | 4/2002 | Chang ......................... | 310/238 |
| 2004/0160138 A1 | * | 8/2004 | Kuroda et al. ................ | 310/90 |

FOREIGN PATENT DOCUMENTS

| | | | |
|---|---|---|---|
| CN | 1525625 A | | 9/2004 |
| JP | 60-2051 | * | 1/1985 |
| JP | 60002051 A | | 1/1985 |
| JP | 09-182353 A | | 7/1997 |
| JP | 2002-119009 A | | 4/2002 |
| JP | 2002-345198 A | | 11/2002 |

* cited by examiner

*Primary Examiner*—Burton Mullins
(74) *Attorney, Agent, or Firm*—Sughrue Mion, PLLC

(57) ABSTRACT

A rear-end bearing accommodating portion that has a floored cylindrical shape is formed integrally on a rear bracket. A brush apparatus is mounted to the rear bracket by mounting a slinger portion onto an end portion of a shaft so as to cover slip rings. A rectifier is mounted to the rear bracket in close proximity to the rear-end bearing accommodating portion and the slinger portion. A rolling bearing is configured into a creep preventing bearing in which a resin band is mounted into a ring-shaped recessed groove that is recessed into an outer circumferential surface of an outer ring. A first slit is disposed through the slinger portion so as to be positioned so as to face downward when mounted to a vehicle and so as to communicate between an internal portion and an external portion of the slinger portion.

5 Claims, 5 Drawing Sheets

AUTOMOTIVE DYNAMOELECTRIC MACHINE

BACKGROUND OF THE INVENTION

1. Field of the Invention

The present invention relates to an automotive dynamoelectric machine that is mounted to a passenger car, or a truck, etc.

2. Description of the Related Art

In conventional automotive alternators, bearing accommodating portions are configured as separate members from a frame and are mounted to mount surfaces of the frame in a closely-fitted state. Rolling bearings are accommodated in the bearing accommodating portions, and a rotor that generates field magnetic flux is rotatably held by the frame by supporting a rotating shaft thereof in the rolling bearings. Slip rings are mounted to a portion of the rotating shaft that projects through the bearing accommodating portions. A brush apparatus includes: a brush holder that accommodates brushes; and a slip ring cover that covers an outer circumference of the slip rings. Airtightness of a space around the slip rings is maintained by covering the space in question in a tube body that is constituted by the brush holder and the slip ring cover (see Patent Literature 1, for example).

Patent Literature 1: Japanese Patent Laid-Open No. 2002-345198 (Gazette)

In conventional automotive alternators, because the rolling bearings, the slip rings, and the brushes, etc., are disposed in close proximity, service temperatures of each of these parts have been increasing in recent years with increases in automotive alternator output, and effects thereof on the service life of the rolling bearings and the brushes, etc., have become a problem.

SUMMARY OF THE INVENTION

The present invention aims to solve the above problems and an object of the present invention is to provide an automotive dynamoelectric machine that achieves extension of service life of brushes and rolling bearings, etc., by forming a ventilation channel in a slinger that covers a space around slip rings so as to suppress temperature increases in the slip rings by making a cooling airflow flow through the space in question.

In order to achieve the above object, according to one aspect of the present invention, there is provided an automotive dynamoelectric machine that includes: a housing on which a bearing accommodating portion is formed integrally; a rotor that generates field magnetic flux; and a rolling bearing that is accommodated in the bearing accommodating portion so as to rotatably support a shaft of the rotor. Also included are: a slip ring that is mounted to a portion of the shaft that projects outside the housing through the bearing accommodating portion; and a brush apparatus in which a brush holder portion is disposed so as to extend integrally from an outer circumference of a slinger portion that has a floored cylindrical shape in a direction that is perpendicular to an axial direction of the slinger portion, and that is mounted to the housing such that the slinger portion is mounted onto an end portion of the shaft so as to cover the slip ring. Additionally included are: a rectifier that is disposed in close proximity to the bearing accommodating portion and the slinger portion; and a ventilating means that makes external air flow into the housing through an air intake aperture that is disposed through the housing in a vicinity of the bearing accommodating portion. The rolling bearing is configured into a creep preventing bearing in which a resin band is mounted into a ring-shaped recessed groove that is recessed into an outer circumferential surface of an outer ring, and a first ventilation channel is disposed through the slinger portion so as to be positioned so as to face downward when mounted to a vehicle and so as to communicate between an internal portion and an external portion of the slinger portion.

According to the present invention, the ventilating means makes external air pass between the slinger portion and the rectifier, and also between the bearing accommodating portion and the rectifier, and flow into the housing through the air intake aperture. Here, differential pressure arises between the internal portion and the external portion of the slinger portion, the external air flows into the slinger through the first ventilation channel, and air inside the slinger flows out through the first ventilation channel, replacing air in a space around the slip rings inside the slinger with external air. Thus, temperature increases in the slip rings and the brushes are suppressed, and temperature increases in the bearing, which is disposed in close proximity to the slip rings and the brushes, are also suppressed, enabling the service life of the brushes and the rolling bearing to be extended.

DETAILED DESCRIPTION OF THE PREFERRED EMBODIMENTS

Embodiment 1

Figure 1:
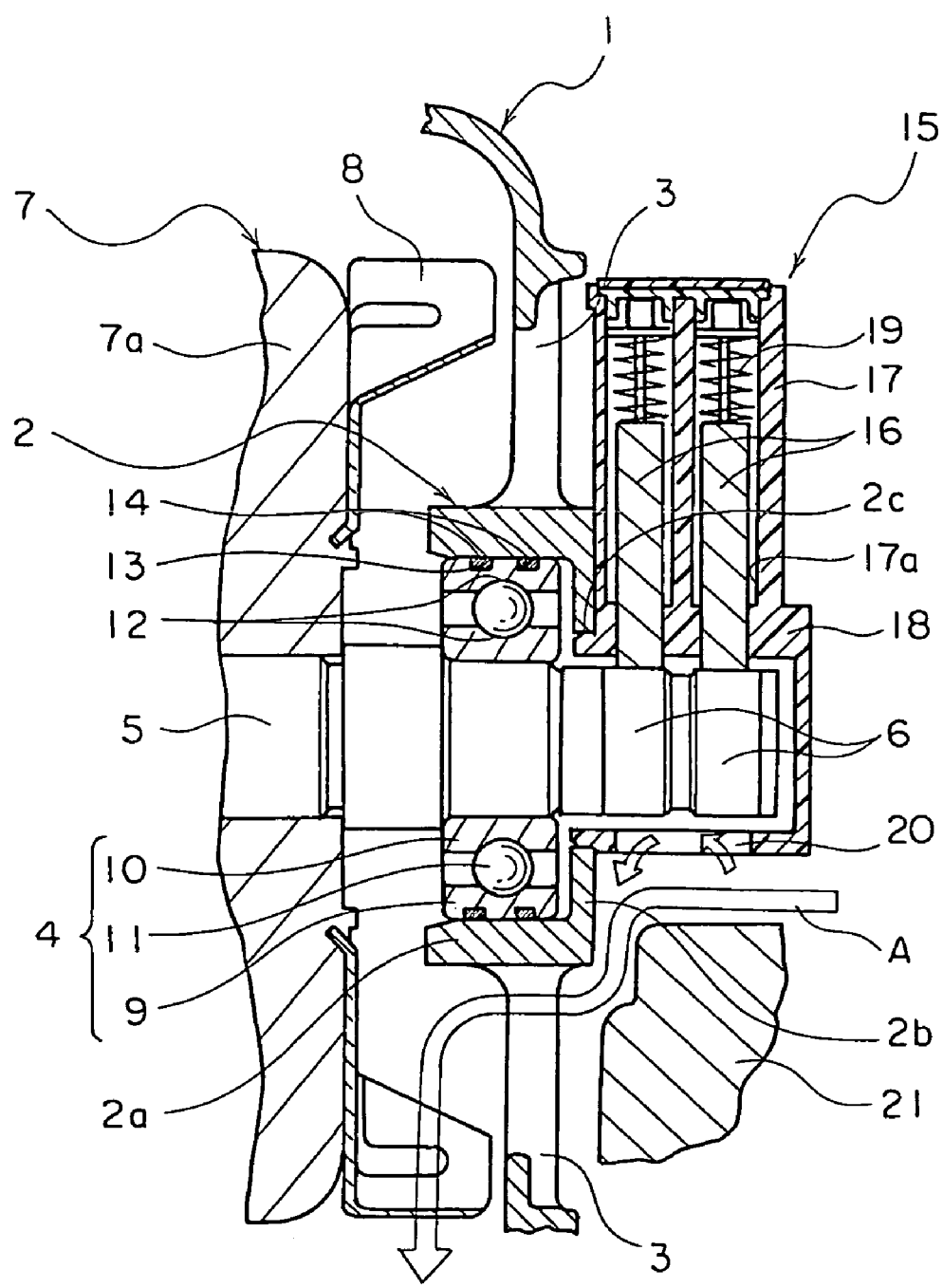
FIG. 1 is a longitudinal section of part of an automotive dynamoelectric machine according to Embodiment 1 of the present invention.

FIG. 1 is a longitudinal section of part of an automotive dynamoelectric machine according to Embodiment 1 of the present invention.

In FIG. 1, a rear bracket 1 is made of aluminum that is formed so as to have a bowl shape and a rear-end bearing accommodating portion 2 that has a floored cylindrical shape that is constituted by a cylindrical portion 2a and a floor portion 2b is formed integrally on a central portion of an end surface of the rear bracket 1 such that an open end thereof faces inward. A shaft insertion aperture 2c is disposed through a central portion of the floor portion 2b of the rear-end bearing accommodating portion 2. A plurality of air intake apertures 3 are disposed through the rear bracket 1 in a vicinity of the rear-end bearing accommodating portion 2. Although not shown, a plurality of air discharge apertures are disposed through a side surface of the rear bracket 1.

Moreover, although not shown, a front bracket that functions together with the rear bracket 1 to constitute a housing is also constructed in a similar manner. In other words, the front bracket is made of aluminum that is formed so as to have a bowl shape and a front-end bearing accommodating portion that has a floored cylindrical shape is formed integrally on a central portion of an end surface of the front bracket such that an open end thereof faces inward. A plurality of air intake apertures are disposed through the front bracket in a vicinity of the front-end bearing accommodating portion. A plurality of air discharge apertures are disposed through a side surface of the front bracket. A shaft insertion aperture is disposed through a central portion of a floor portion of the front-end bearing accommodating portion.

The housing is configured by disposing a front bracket and a rear bracket 1 that are configured in this manner so as to face each other and fastening the front bracket and the rear bracket 1 using bolts (not shown). A bearing (not shown) is accommodated in the front-end bearing accommodating portion and a rolling bearing 4 is accommodated in the rear-end bearing accommodating portion 2. A shaft 5 is supported by the bearing and the rolling bearing 4 so as to be rotatably held in the housing. A pulley (not shown) is fixed to a portion of the shaft 5 that projects outward through the shaft insertion aperture of the front-end bearing accommodating portion. A pair of slip rings 6 are fixed to a portion of the shaft 5 that projects through the shaft insertion aperture 2c of the rear-end bearing accommodating portion 2 so as to be separated axially.

A rotor 7 is fixed to the shaft 5 so as to be rotatably disposed in the housing. The rotor 7 includes: a field winding (not shown) that generates magnetic flux on passage of electric current; and a pair of rotor cores 7a that are disposed so as to cover the field winding such that magnetic poles are formed by the magnetic flux. Centrifugal fans 8 that function as a ventilating means are fixed to two axial end surfaces of the pair of rotor cores 7a. In addition, although not shown, a stator is mounted to the housing so as to surround the rotor 7.

The rolling bearing 4 has: a cylindrical outer ring 9; and a cylindrical inner ring 10 that is disposed so as to be concentric with the outer ring 9, and is configured such that a single ball raceway 12 is formed in facing wall surfaces between the outer ring 9 and the inner ring 10 and a plurality of balls 11 are disposed in the ball raceway 12. Two ring-shaped recessed grooves 13 are formed on an outer circumferential surface of the outer ring 9 so as to be on mutually opposite sides of the ball raceway 12, and resin bands 14 that function as a creep preventing material are mounted into each of the recessed grooves 13. Moreover, the resin bands 14 are prepared using a polybutyl terephthalate (PBT) resin, or a polyamide resin, etc.

The brush apparatus 15 includes: a brush holder portion 17; and a slinger portion 18 that has a floored cylindrical shape that is resin-molded integrally with the brush holder portion 17. The brush holder portion 17 is disposed so as to extend from an outer circumferential surface of the slinger portion 18 in a direction that is perpendicular to a central axis of the slinger portion 18. Brush insertion apertures 17a are formed on the brush holder portion 17 so as to be separated in an axial direction of the slinger portion 18 and face into the slinger portion 18. The brush apparatus 15 is mounted by placing the slinger portion 18 over a rear-end end portion of the shaft 5 so as to cover a space around the slip rings 6 and fastening the brush holder portion 17 to the rear bracket 1. Brushes 16 are inserted into each of the brush insertion apertures 17a and are pressed onto the slip rings 6 by forces from springs 19. A long, thin first slit 20 that functions as a first ventilation channel is disposed through an outer circumferential surface of the slinger portion 18 so as to have a longitudinal direction that is aligned with an axial direction of the shaft 5. The first slit 20 is formed so as to be positioned so as to face downward when the automotive dynamoelectric machine is mounted to a vehicle.

A rectifier 21 is fastened to the rear bracket 1 so as to face the first slit 20 such that a predetermined clearance is ensured between the slinger portion 18 and the rear-end bearing accommodating portion 2.

In addition, a cover (not shown) is mounted to the rear bracket 1 so as to cover the brush apparatus 15 and the rectifier 21.

Operation of an automotive dynamoelectric machine that is configured in this manner will now be explained.

First, electric current is supplied from a battery (not shown) through the brushes 16 and the slip rings 6 to the field winding of the rotor 7, generating magnetic flux. Some claw-shaped magnetic poles of the rotor cores 7a are magnetized into North-seeking (N) poles by this magnetic flux, and other claw-shaped magnetic poles of the rotor cores 7a are magnetized into South-seeking (S) poles. At the same time, rotational torque from an engine is transmitted from an output shaft of the engine through a belt and the pulley to the shaft 5, rotating the rotor 7. Thus, a rotating magnetic field is applied to a stator winding of the stator, generating an electromotive force in the stator winding. This alternating-current electromotive force is rectified into direct current by the rectifier 21 so as to charge the battery and be supplied to an electric load, etc.

During starting of the engine, alternating current is supplied sequentially to the stator winding, and field current is supplied to the field winding through the brushes 16 and the slip rings 6. Thus, the stator winding and the field winding become electromagnets, and the rotor 7 rotates inside the stator together with the shaft 5. Torque from the shaft 5 is transmitted from the pulley to the output shaft of the engine by means of the belt, starting the engine.

In this automotive dynamoelectric machine, when the rotor shaft 5 is rotated, the centrifugal fans 8 are driven to rotate together with the rotor 7. As indicated by arrows A in FIG. 1, external air passes between the slinger portion 18 and the rectifier 21 and between the rear-end bearing accommodating portion 2 and the rectifier 21 and is sucked into the housing through the air intake apertures 3 due to rotation of the centrifugal fans 8. External air that has been sucked in through the air intake apertures 3 is deflected centrifugally by the centrifugal fans 8, and is discharged outside the housing through the air discharge apertures. The rear-end bearing accommodating portion 2 is thereby cooled. In addition, heat from rear-end coil ends of the stator winding is absorbed into the cooling airflow, cooling the stator.

Here, differential pressure arises between an internal portion and an external portion of the slinger portion 18 as the external air flows between the slinger portion 18 and the rectifier 21. Thus, external air flows into the slinger portion 18 through the first slit 20, and the air inside the slinger portion 18 flows out of the slinger portion 18 through the first slit 20. The air inside the slinger portion 18 is thereby replaced with external air, cooling a vicinity of the slip rings 6 and the brushes 16.

Moreover, at the front end, external air that has been sucked in through the air intake apertures is also deflected centrifugally by the centrifugal fans 8, and is discharged outside the housing through the air discharge apertures. Heat from front-end coil ends of the stator winding is thereby absorbed into the cooling airflow, cooling the stator.

The rear-end bearing accommodating portion 2 and the rolling bearing 4 expand due to the heat generated during the operation of the automotive dynamoelectric machine. Because the rear-end bearing accommodating portion 2 is made of aluminum and the rolling bearing 4 is made of a carbon steel, the rear-end bearing accommodating portion 2 and the rolling bearing 4 expand in such a way that gaps arise between the rear-end bearing accommodating portion 2 and the outer ring 9 of the rolling bearing 4 as a result of differences in thermal expansion between the two. Thus, coupling strength between the rear-end bearing accommodating portion 2 and the rolling bearing 4 weakens, and the outer ring 9 turns together with the shaft 5, and there is a risk that the rear-end bearing accommodating portion 2 may be heated excessively by frictional heat between the rear-end bearing accommodating portion 2 and the outer ring 9 until the outer ring 9 eventually slips (creeps). However, if the rear-end bearing accommodating portion 2 is heated excessively, the resin bands 14 will expand more than the rear-end bearing accommodating portion 2, ensuring coupling strength between the rear-end bearing accommodating portion 2 and the rolling bearing 4, and preventing the outer ring 9 from slipping.

According to Embodiment 1, because the bearing accommodating portion 2 is formed integrally on the rear bracket 1, the number of parts is reduced and assembly man-hours are also reduced, enabling cost reductions.

Because the rolling bearing 4 is configured into a creep preventing bearing in which resin bands 14 are fitted into recessed grooves 13 that are formed on an outer circumferential surface of the outer ring 9, it is not necessary to dispose creep preventing parts such as rings, etc., separately, enabling simplification of the configuration.

Because the first slit 20 is disposed through an outer circumferential surface of the slinger portion 18 so as to be parallel to the flow of air generated by the centrifugal fans 8, differential pressure arises between the internal portion and the external portion of the slinger portion 18, replacing air inside the slinger portion 18 with external air through the first slit 20. Thus, because the slip rings 6 and the brushes 16 are cooled, and the rolling bearing 4 and the rear-end bearing accommodating portion 2, which are in close proximity to the slip rings 6, are also cooled, the service life of the brushes 16 and the rolling bearing 4 can be extended.

Because the first slit 20 is formed so as to face downward when the automotive dynamoelectric machine is mounted to a vehicle, water, oil, dust, etc., are less likely to enter the brush holder portion 17 and the slinger portion 18. Even if water, oil, dust, etc., does happen to enter the brush holder portion 17 or the slinger portion 18, it will be promptly discharged through the first slit 20.

Because the rectifier 21 is disposed so as to face the first slit 20 so as to have a predetermined clearance from the slinger portion 18, air flows along the first slit 20 while the centrifugal fans 8 are operating. Thus, external air flows directly into the slinger portion 18 through the first slit 20, enabling the inside of the slinger 18 to be cooled effectively. Here, the clearance between the rectifier 21 and the slinger portion 18 should be adjusted to ensure a required airflow rate.

Moreover, in Embodiment 1 above, one first slit 20 is disposed through an outer circumferential surface of the slinger portion 18, but the number of first slits 20 is not limited to one, and a plurality of first slits 20 may also be disposed in close proximity circumferentially.

Embodiment 2

Figure 2:
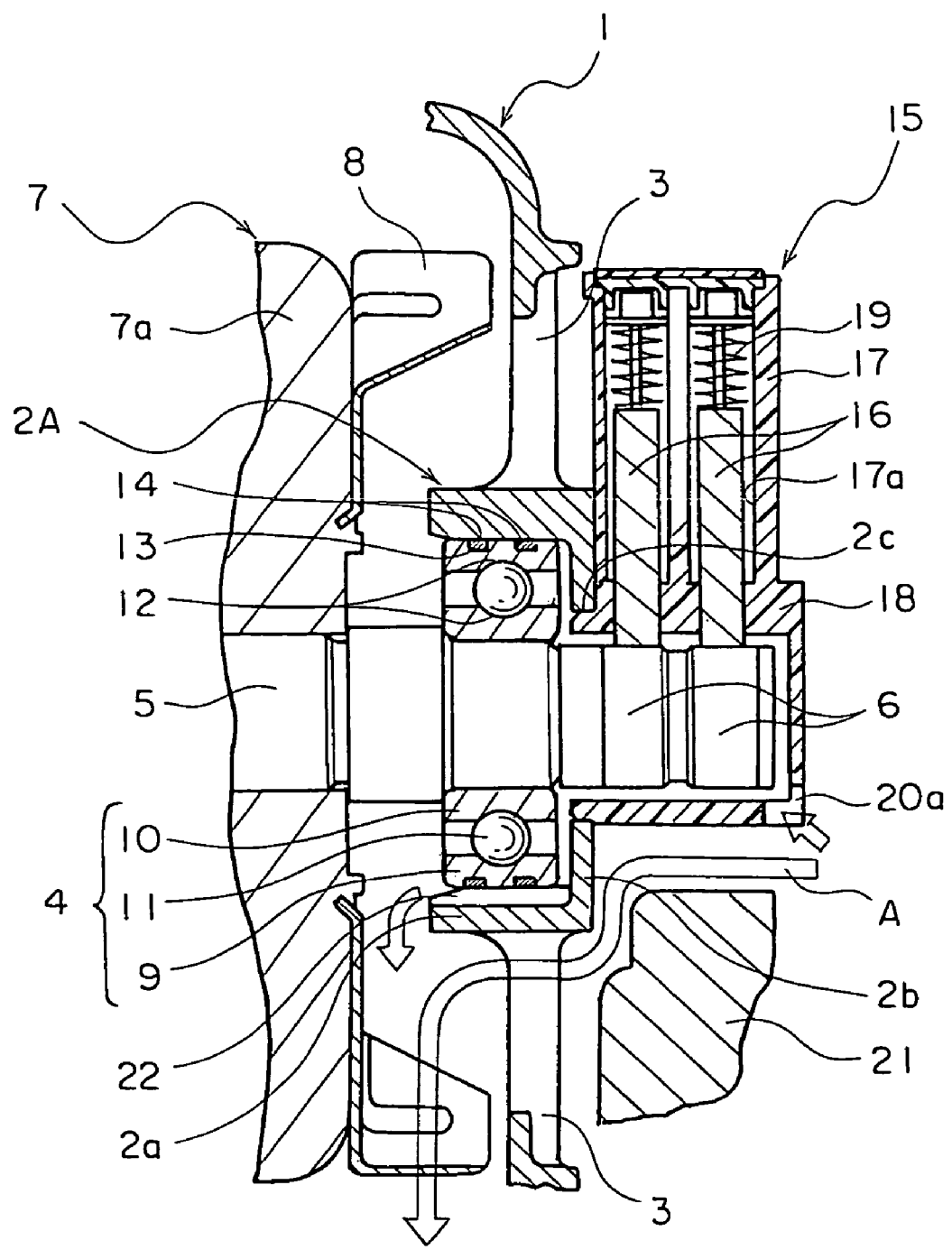
FIG. 2 is a longitudinal section of part of an automotive dynamoelectric machine according to Embodiment 2 of the present invention.
Figure 3:
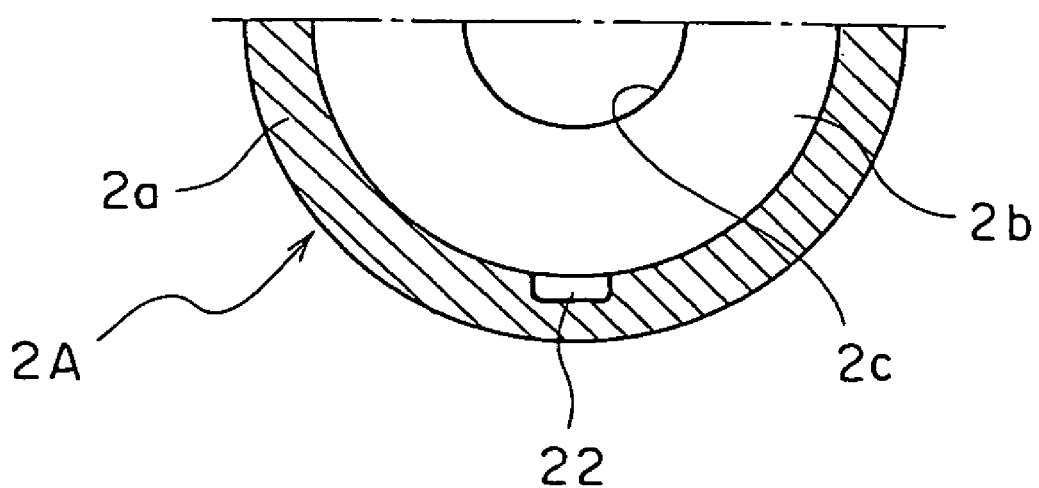
FIG. 3 is a cross section that explains a configuration of a rear-end bearing accommodating portion in the automotive dynamoelectric machine according to Embodiment 2 of the present invention.
Figure 4:
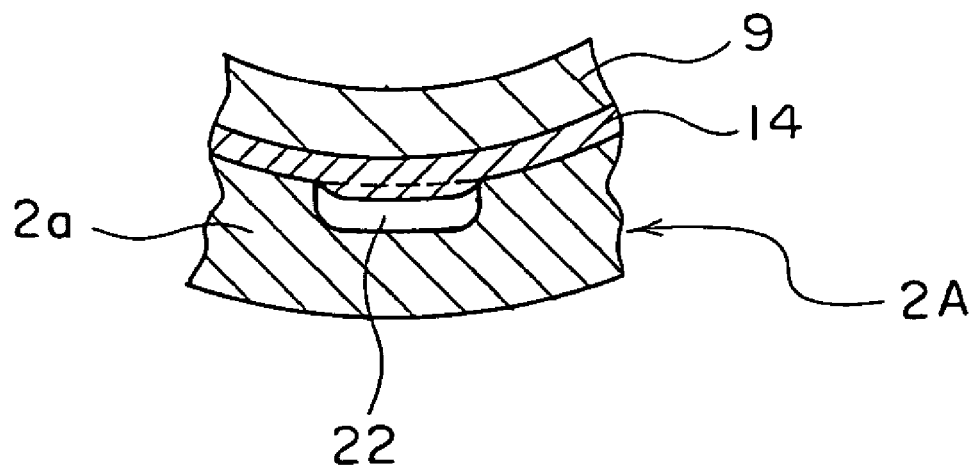
FIG. 4 is a partial cross section that shows a state in which a rolling bearing is accommodated in the rear-end bearing accommodating portion in the automotive dynamoelectric machine according to Embodiment 2 of the present invention.

FIG. 2 is a longitudinal section of part of an automotive dynamoelectric machine according to Embodiment 2 of the present invention, FIG. 3 is a cross section that explains a configuration of a rear-end bearing accommodating portion in the automotive dynamoelectric machine according to Embodiment 2 of the present invention, and FIG. 4 is a partial cross section that shows a state in which a rolling bearing is accommodated in the rear-end bearing accommodating portion in the automotive dynamoelectric machine according to Embodiment 2 of the present invention.

In FIGS. 2 through 4, a second slit 22 that functions as a second ventilation channel is recessed into an inner wall surface of a cylindrical portion 2a of a rear-end bearing accommodating portion 2A so as to have a groove direction that is aligned in an axial direction of the shaft 5 and so as to extend from a floor portion 2b to an opening. A first slit 20a that functions as a first ventilation channel is disposed through an intersecting portion between a floor portion and a cylindrical portion of a slinger portion 18. The first slit 20a and the second slit 22 are formed so as to be positioned so as to face downward when the automotive dynamoelectric machine is mounted to a vehicle.

Moreover, the rest of this embodiment is configured in a similar manner to Embodiment 1 above.

In Embodiment 2, when the centrifugal fans 8 are driven, external air passes between the slinger portion 18 and the rectifier 21 and also between the rear-end bearing accommodating portion 2A and the rectifier 21, and is sucked into the housing through the air intake apertures 3. Negative pressure also arises on inner circumferential sides of the centrifugal fans 8, and external air is sucked into the slinger portion 18 through the first slit 20a, flows along the shaft 5 toward the rear-end bearing accommodating portion 2A, and flows into the housing through the second slit 22.

Thus, in Embodiment 2, the slip rings 6 and the brushes 16 are also cooled by the external air that flows into the slinger portion 18 through the first slit 20a, enabling the service life of the brushes 16 to be extended.

In Embodiment 2, the rolling bearing 4 and the rear-end bearing accommodating portion 2A are also cooled directly by external air that flows through the second slit 22, enabling the service life of the rolling bearing 4 to be extended.

In addition, because the resin bands 14 are wedged inside the second slit 22 when they expand, as shown in FIG. 4, a large creep preventing effect can be achieved.

Moreover, in Embodiment 2 above, the number of first slits 20a and second slits 22 is not limited to one each.

In Embodiment 2 above, the second slit 22 is formed so as to be positioned so as to face downward when the automotive dynamoelectric machine is mounted to a vehicle, but it is not absolutely necessary for the second slit 22 be formed so as to be positioned so as to face downward when the automotive dynamoelectric machine is mounted to a vehicle.

Embodiment 3

Figure 5:
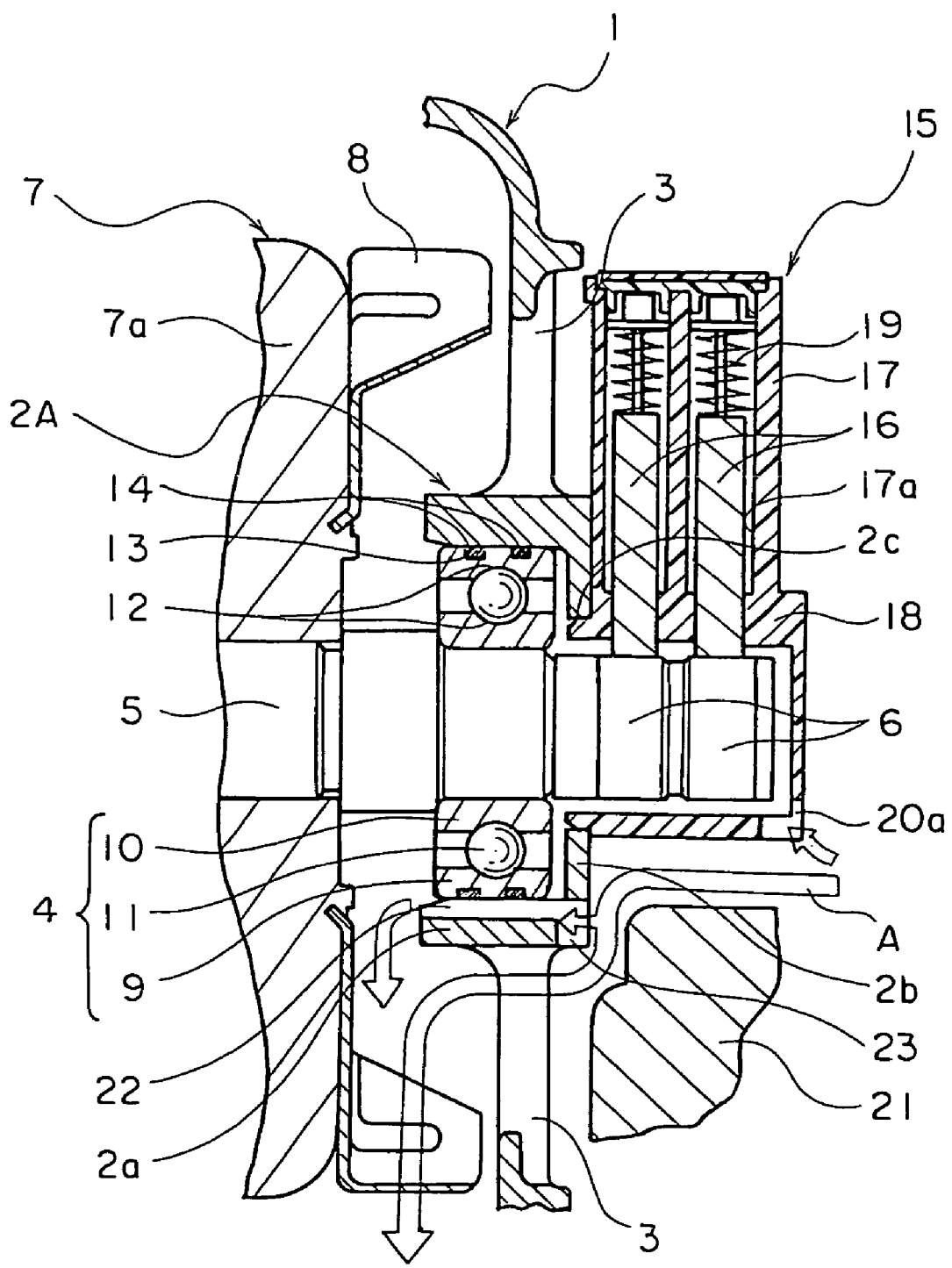
FIG. 5 is a longitudinal section of part of an automotive dynamoelectric machine according to Embodiment 3 of the present invention.

FIG. 5 is a longitudinal section of part of an automotive dynamoelectric machine according to Embodiment 3 of the present invention.

In FIG. 5, a third slit 23 that functions as a third ventilation channel is disposed through an intersecting portion between a cylindrical portion 2a and a floor portion 2b of a rear-end bearing accommodating portion 2A so as to be positioned so as to face downward when the automotive dynamoelectric machine is mounted to a vehicle. A second slit 22 and an external portion of the rear-end bearing accommodating portion 2A thereby communicate through the third slit 23.

Moreover, the rest of this embodiment is configured in a similar manner to Embodiment 2 above.

In Embodiment 3, when the centrifugal fans 8 are driven, external air passes between the slinger portion 18 and the rectifier 21 and also between the rear-end bearing accommodating portion 2A and the rectifier 21, and is sucked into the housing through the air intake apertures 3. Here, a portion of the external air that has flowed to the third slit 23 flows in through the third slit 23, passes through the second slit 22, and into the housing. Negative pressure also arises on inner circumferential sides of the centrifugal fans 8, and external air is sucked into the slinger portion 18 through the first slit 20a, flows along the shaft 5 toward the rear-end bearing accommodating portion 2A, and flows into the housing through the second slit 22.

In Embodiment 3, a third slit 23 is formed in the rear-end bearing accommodating portion 2A so as to communicate between the second slit 22 and the external portion of the rear-end bearing accommodating portion 2A. Thus, because a portion of the external air that has flowed through between the slinger portion 18 and the rectifier 21 to the third slit 23 flows in through the third slit 23, passes through the second slit 22, and into the housing, the quantity of flow of external air that flows through the second slit 22 is increased. Because the external air passes through the third slit 23 then flows through the second slit 22, the volume of air that flows into the slinger portion 18 through the first slit 20a is increased.

Thus, because the slip rings 6, the brushes 16, the rolling bearing 4, and the rear-end bearing accommodating portion 2A can be cooled effectively, the service life of the brushes 16 and the rolling bearing 4 can be extended further.

Because the second slit 22 and the third slit 23 are positioned so as to face downward when mounted to a vehicle, even if water, oil, dust, etc., enters the rear-end bearing accommodating portion 2A from the slinger portion 18 side, it will be promptly discharged through the third slit 23.

Embodiment 4

Figure 6:
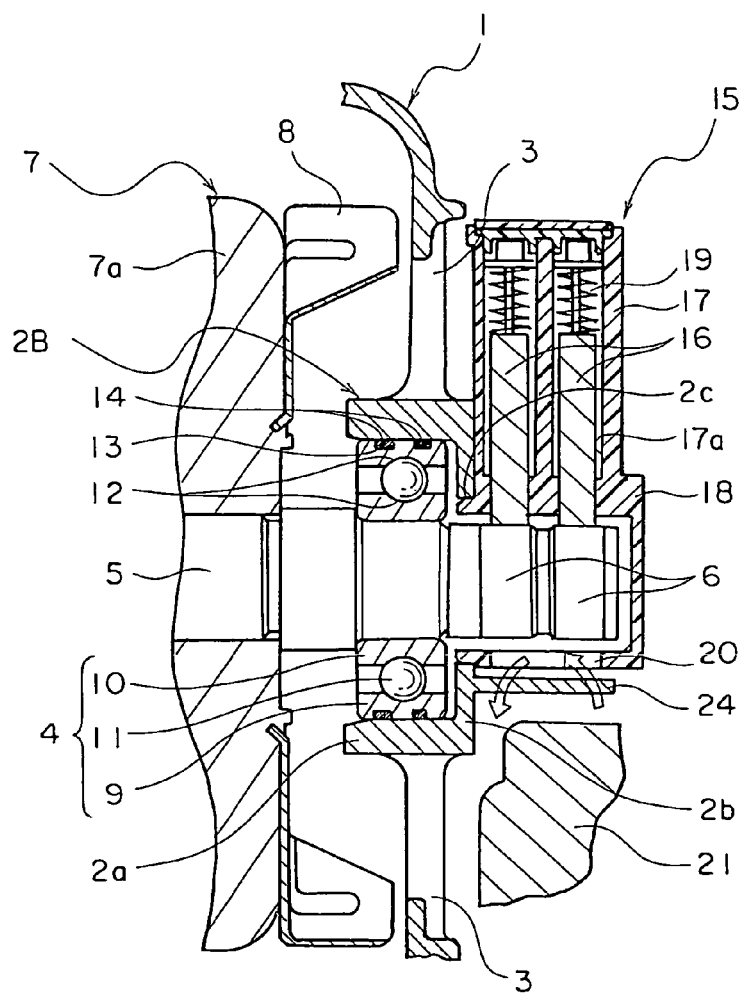
FIG. 6 is a longitudinal section of part of an automotive dynamoelectric machine according to Embodiment 4 of the present invention.
Figure 7:
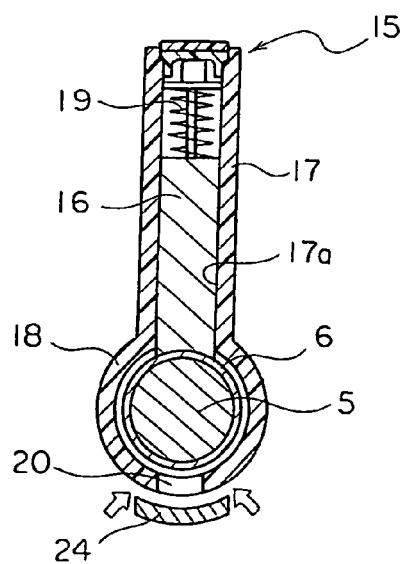
FIG. 7 is a partial cross section of a vicinity of a slinger portion in the automotive dynamoelectric machine according to Embodiment 4 of the present invention.

FIG. 6 is a longitudinal section of part of an automotive dynamoelectric machine according to Embodiment 4 of the present invention, and FIG. 7 is a partial cross section of a vicinity of a slinger portion in the automotive dynamoelectric machine according to Embodiment 4 of the present invention.

In FIGS. 6 and 7, a protective wall 24 that has an arc-shaped cross section is disposed so as to extend from a floor portion 2b of a rear-end bearing accommodating portion 2B so as to ensure a predetermined clearance relative to an outer circumferential wall surface of a slinger portion 18 and to cover a first slit 20.

Moreover, the rest of this embodiment is configured in a similar manner to Embodiment 1 above.

In Embodiment 4, because the protective wall 24 is formed so as to cover the first slit 20, foreign matter such as water, or oil, etc., is prevented from entering the slinger portion 18 through the first slit 20.

The protective wall 24 is formed so as to ensure a predetermined clearance relative to the outer circumferential wall surface of the slinger portion 18. Thus, because differential pressure arises between an internal portion and an external portion of the slinger portion 18 as external air flows through between the slinger portion 18 and the rectifier 21 and air inside the slinger portion 18 is replaced with external air, coolability in a vicinity of the slip rings 6 and the brushes 16 will not be lost.

Moreover, in each of the above embodiments, the rolling bearing 4 is explained as being constituted by a single row bearing that has a single ball raceway 12. However, a rolling bearing may also be constituted by a multi-row bearing in which a plurality of ball raceways 12 are disposed axially and balls 11 are disposed in each of the ball raceways 12.

In each of the above embodiments, centrifugal fans 8 are used for the ventilating means, but the ventilating means is not limited to the centrifugal fans 8, and axial fans that are fixed to two axial end surfaces of the rotor 7 may also be used. External fans may also be mounted outside the rear bracket 1 so as to make external air pass into the housing.

In each of the above embodiments, an automotive generator-motor has been explained, but the present invention can be applied to any automotive dynamoelectric machine such as an automotive alternator, an automotive electric motor, etc.

What is claimed is:

1. An automotive dynamoelectric machine comprising:
a housing on which a bearing accommodating portion is formed integrally;
a rotor that generates field magnetic flux;
a rolling bearing that is accommodated in said bearing accommodating portion so as to rotatably support a shaft of said rotor;
a slip ring that is mounted to a portion of said shaft that projects outside said housing through said bearing accommodating portion;
a brush apparatus in which a brush holder portion is disposed so as to extend integrally, from an outer circumference of a slinger portion that has a shape of a cylinder with a floor, in a direction that is perpendicular to an axial direction of said slinger portion, and that is mounted to said housing such that said slinger portion is mounted onto an end portion of said shaft so as to cover said slip ring;
a rectifier that is disposed in close proximity to said bearing accommodating portion and said slinger portion; and
a ventilating means that makes external air flow into said housing through an air intake aperture that is disposed through said housing in a vicinity of said bearing accommodating portion,
wherein:
said rolling bearing is configured into a creep preventing bearing in which a resin band is mounted into a ring-shaped recessed groove that is recessed into an outer circumferential surface of an outer ring; and
a first ventilation channel is disposed through said slinger portion so as to be positioned so as to face downward when mounted to a vehicle and so as to communicate between an internal portion and an external portion of said slinger portion;
said machine further comprising a second ventilation channel that is recessed into an inner wall surface of a cylindrical portion of said bearing accommodating portion so as to have a groove direction that is aligned in an axial direction of said shaft and so as to extend from an inner floor surface of said bearing accommodating portion to an opening.

2. An automotive dynamoelectric machine according to claim 1, further comprising a third ventilation channel that is disposed through said bearing accommodating portion in a region of intersection between said cylindrical portion and a floor portion so as to communicate between said second ventilation channel and an external portion of said bearing accommodating portion.

3. An automotive dynamoelectric machine according to claim 2, wherein said second ventilation channel is recessed into said inner wall surface of said cylindrical portion so as to be positioned so as to face downward when mounted to a vehicle.

4. An automotive dynamoelectric machine according to claim 1, further comprising a protective wall that is disposed so as to extend from a floor portion of said bearing accommodating portion in an axial direction of said shaft so as to cover said first ventilation channel.

5. An automotive dynamoelectric machine according to claim 1, wherein said ventilating means is a centrifugal fan that is fixed to an axial end portion of said rotor.

* * * * *